United States Patent
Luo et al.

(10) Patent No.: US 10,091,093 B2
(45) Date of Patent: Oct. 2, 2018

(54) MULTI-CONTROLLER CONTROL TRAFFIC BALANCING IN SOFTWARE DEFINED NETWORKS

(71) Applicant: Futurewei Technologies, Inc., Plano, TX (US)

(72) Inventors: Min Luo, Cummings, GA (US); Shih-Chun Lin, Alpharetta, GA (US); Ian F. Akyildiz, Alpharetta, GA (US)

(73) Assignee: Futurewei Technologies, Inc., Plano, TX (US)

( * ) Notice: Subject to any disclaimer, the term of this patent is extended or adjusted under 35 U.S.C. 154(b) by 68 days.

(21) Appl. No.: 15/199,387

(22) Filed: Jun. 30, 2016

(65) Prior Publication Data

US 2018/0006928 A1    Jan. 4, 2018

(51) Int. Cl.
| | |
|---|---|
| G01R 31/08 | (2006.01) |
| H04L 12/28 | (2006.01) |
| H04L 12/727 | (2013.01) |
| H04L 12/715 | (2013.01) |
| H04L 12/851 | (2013.01) |
| H04L 12/24 | (2006.01) |

(52) U.S. Cl.
CPC .......... H04L 45/121 (2013.01); H04L 41/042 (2013.01); H04L 45/64 (2013.01); H04L 47/24 (2013.01)

(58) Field of Classification Search
CPC ....... H04L 45/121; H04L 45/24; H04L 45/56; H04L 45/64
See application file for complete search history.

(56) References Cited

U.S. PATENT DOCUMENTS

| | | | | |
|---|---|---|---|---|
| 2014/0301192 | A1* | 10/2014 | Lee | H04L 47/10 370/230 |
| 2016/0127250 | A1* | 5/2016 | McCormick | H04L 47/283 370/235 |
| 2016/0254984 | A1* | 9/2016 | Tekalp | H04L 45/02 709/242 |
| 2016/0294675 | A1* | 10/2016 | Ji | H04L 43/0882 |
| 2017/0055175 | A1* | 2/2017 | Leroux | H04W 28/0231 |
| 2017/0078183 | A1* | 3/2017 | Civanlar | H04L 45/02 |
| 2017/0085630 | A1* | 3/2017 | Luo | H04L 67/1002 |
| 2017/0237649 | A1* | 8/2017 | Sampath | H04L 45/125 370/238 |

(Continued)

OTHER PUBLICATIONS

"OpenFlow Swith Specification, Version 1.4.0 (Wire Protocol 0x05)", Open Networking Foundation, [online]. Retrieved from the Internet: <URL: https://www.opennetworking.org/images/stories/downloads/sdn-resources/onf-specifications/openflow/openflow-spec-v1.4.0.pdf>, (Oct. 14, 2013), 206 pgs.

(Continued)

*Primary Examiner* — Faruk Hamza
*Assistant Examiner* — Abu-Sayeed Haque
(74) *Attorney, Agent, or Firm* — Schwegman Lundberg & Woessner, P.A.

(57) ABSTRACT

A method includes determining a number and placement of multiple controllers in a software defined network (SDN) such that each controller controls a different set of software controlled switches in the SDN and finding optimal forwarding paths for control traffic between the switches and controllers to minimize delay of control traffic over the software defined network.

20 Claims, 9 Drawing Sheets

(56) References Cited

U.S. PATENT DOCUMENTS

2017/0295082 A1* 10/2017 Wu .................. H04L 43/14
2017/0310574 A1* 10/2017 Wolting ............ H04L 45/02
2017/0353382 A1* 12/2017 Gupta .............. H04L 45/28

OTHER PUBLICATIONS

"Sprint IP Network Performance", © 2012 Sprint. [online]. [archived on Feb. 14, 2012]. Retrieved from the Internet: <URL: https://web.archive.org/web/20120214042603/http://www.sprint.net/performance/>, (2012), 1 pg.
Adami, Davide, et al., "Class-based Traffic Recovery with Load Balancing in Software-Defined Networks", *Globecom 2014 Workshop—The 6th IEEE International Workshop on Management of Emerging Networks and Services*, (2014), 161-165.
Akyildiz, Ian F., et al., "A roadmap or traffic engineering in SDN-OpenFlow networks", *Computer Networks*, vol. 71, (Oct. 2014), 1-30.
Akyildiz, Ian E., et al., "Softair: A software defined networking architecture for 5g wireless systems", *Computer Networks*, vol. 85, (Jul. 2015), 1-18.
Bari, MD. Faizul, et al., "Dynamic Controller Provisioning in Software Defined Networks", *9th International Conference on Network and Service Management (CNSM)*, (2013), 18-25.
Beheshti, Neda, et al., "Fast Failover for Control Traffic in Software-defined Networks", *IEEE Globecom 2012—Next Generation Networking and Internet Symposium*, (Dec. 2012), 2665-2670.
Boyd, Stephen, et al., "Distributed Optimization and Statistical Learning via the Alternating Direction Method of Multipliers", *Foundations and Trends in Mannine Learning*, 3(1), (Nov. 19, 2010), 1-122.
Gross, D., et al., *Fundamentals of Queueing Theory*, John Wiley & Sons, Inc., 4th Edition, (2008), 1-500.
Heller, Brandon, et al., "The Controller Placement Problem", *ACM HotSDN '12*, Aug. 13, 2012, Helsinki, Finland, (Aug. 2012), 7-12.
Hochbaum, Dorit S., et al., "Complexity and algorithms for nonlinear optimization problems", *Ann Oper Res.*, 153(1), (2007), 257-296.
Hong, Chi-Yao, et al., "Achieving High Utilization with Software-Driven Wan", *Proceedings of ACM SIGCOMM Conference (Sigcomm '13*, Aug. 12-16, 2013, Hong Kong, China, (Aug. 12, 2013), 15-26.
Hu, Yannan, et al., "On Reliability-optimized Controller Placement for Software-Defined Networks", *China Communications*, 11(2), (Feb. 2014), 38-54.
Jain Sushant, et al., "B4: Experience with a Globally-Deployed Software Defined WAN", *ACM SIGCOMM '13*, Aug. 12-16, 2013, Hong Kong, China, (Aug. 2013), 3-14.
Karlan, Samuel, et al., *First Course in Stochastic Process*, Second Edition, Academic Press, Inc., New York, NY 10003, (1975), 573 pgs.
Lange, Stanislav, et al., "Heuristic Approaches to the Controller Placement Problem in Large Scale SDN Networks", *IEEE Transactions on Network and Service Management*, 12(1), (Mar. 2015), 4-17.
Lin, Shih-Chun, et al., "Control traffic balancing in software defined networks", *Computer Networks*, 106, (2016), 260-271.
Mallik, Arijit, et al., "A novel proposal to effectively combine rnultipath data forwarding for data center networks with congestion control and load balancing using Software-Defined Networking Approach", *2014 International Conference on Recent Trends in Information Technology*, (Apr. 2014), 7 pgs.
McKeown, Nick, et al., "OpenFlow: Enabling Innovation in Campus Networks", *ACM SIGCOMM Computer Communication Review*, 38 (2), (Apr. 2008), 69-74.
Rath, Hemant K., et al., "Optimal Controller Placement in Software Defined Networks (SDN) using a Non-Zero-Sum Game", *IEEE 15th International Symposium on a World of Wireless, Mobile and Multimedia Networks (WoWMom)*, (Jun. 2014), 1-6.
Sallahi, Afrim, et al., "Optimal Model for the Controller Placement Problem in Software De?ned Networks", *IEEE Commun. Letters*, 19(1), (Jan. 2015), 30-33.
Tuncer, Daphne, et al., "Adaptive Resource Management and Control in Software Defined Networks", *IEEE Transactions on Network and Service Management*, 12(1), (Mar. 2015), 18-33.
Yao, Guang, et al., "On the Capacitated Controller Placement Problem in Software Defined Networks", *IEEE Commun. Letters*, 18(8), (Aug. 2014), 1339-1342.
Yeganeh, Soheil H., et al., "On Scalability of Software-Defined Networking", *IEEE Communications Magazine*, 51(2), (Feb. 2013), 136-141.

* cited by examiner

LINKS

CENTRALIZED CONTROL

DATAFLOW

CONTROL FLOW

US 10,091,093 B2

MULTI-CONTROLLER CONTROL TRAFFIC BALANCING IN SOFTWARE DEFINED NETWORKS

CROSS REFERENCE TO RELATED APPLICATIONS

This application is related to U.S. patent application Ser. No. 15/141,367, filed Apr. 28, 2016.

FIELD OF THE INVENTION

The present disclosure is related to software defined networks, and in particular to configuring multiple controllers and control traffic balancing in software defined networks.

BACKGROUND

An emerging networking paradigm that separates a network control plane from a data forwarding plane is a software-defined network (SDN). As a promising paradigm for dramatically improving network resource utilization, simplifying network management, reducing operating costs, and promoting innovation and evolution, SDN has shown great potential for data center networks and the next-generation Internet.

Recently, SDN has been extended to support 5G communication networks. The main functions of SDN are (i) to separate the data plane from the control plane and (ii) to introduce novel network control functionalities based on an abstract representation of the network. In current instantiations of SDN, these functions are realized by (i) removing control decisions (e.g., routing) from the hardware (e.g., switches or routers), (ii) enabling programmable flow tables in the hardware through an open, standardized interface (e.g., Openflow—a protocol that allows a server to tell network switches where to send packets), and (iii) using a logically centralized network controller that defines the behavior and operation of the network forwarding infrastructure.

Existing work to address these problems focuses on balancing data traffic in data plane, which aims to evenly distribute data traffic flows among network links. Further work focuses on the "pure" facility allocation problem that considers the optimal network planning for the minimum required facilities, and does not take the impact on the traffic performance from the given allocation into account.

SUMMARY

A method includes determining a number and placement of multiple controllers in a software defined network (SDN) such that each controller controls a different set of software controlled switches in the SDN and finding optimal forwarding paths for control traffic between the switches and controllers to minimize delay of control traffic over the software defined network.

A computer implemented system includes processing circuitry, a non-transitory storage device coupled to the processing circuitry, and code stored on the storage device for execution by the processing circuitry to perform operations. The operations include determining a number and placement of multiple controllers in a software defined network (SDN) such that each controller controls a different set of software controlled switches in the SDN, and finding optimal forwarding paths for control traffic between the switches and controllers to minimize delay of control traffic over the software defined network.

A non-transitory computer readable storage device has instructions for causing a processor to perform operations. The operations include determining a number and placement of multiple controllers in a software defined network (SDN) such that each controller controls a different set of software controlled switches in the SDN and finding optimal forwarding paths for control traffic between the switches and controllers to minimize delay of control traffic over the software defined network.

DETAILED DESCRIPTION

Figure 1A:
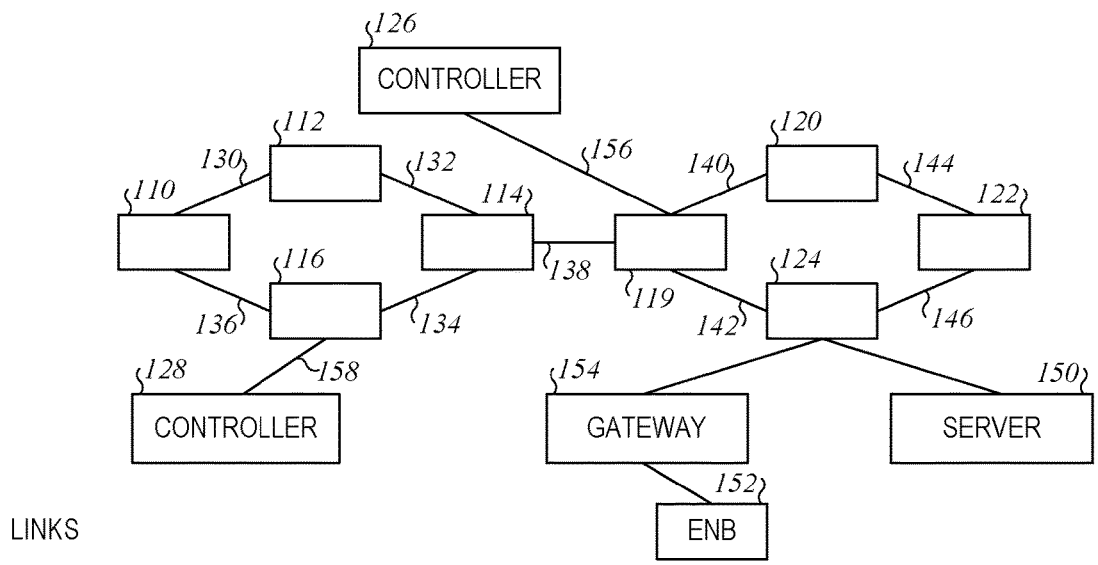
FIG. 1A is a block diagram illustrating various links or connections for transferring data between different devices comprising a software defined network (SDN) according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

An emerging networking paradigm that separates a network control plane from a data forwarding plane is a software-defined network (SDN). As a promising paradigm for dramatically improving network resource utilization, simplifying network management, reducing operating costs, and promoting innovation and evolution, SDN has shown great potential for data center networks and the next-generation Internet.

Recently, SDN has been extended to support 5G communication networks. The main functions of SDN are (i) to separate the data plane from the control plane and (ii) to introduce novel network control functionalities based on an abstract representation of the network. In current instantiations of SDN, these functions are realized by (i) removing control decisions (e.g., routing) from the hardware (e.g., switches or routers), (ii) enabling programmable flow tables in the hardware through an open, standardized interface (e.g., Openflow—a protocol that allows a server to tell network switches where to send packets), and (iii) using a logically centralized network controller that defines the behavior and operation of the network forwarding infrastructure.

Through SDN, when a new flow is initiated and no local forwarding policy is defined in the flow table of a switch, the switch forwards the first packet of the flow to the controller, which determines an appropriate forwarding path. As a result, the timely and reliably delivery of control messages (e.g., the first packet of every new flow, network traffic statistics, and flow instructions to all switches along the selected path) for each software defined or Openflow switch largely impacts the efficiency and effectiveness of SDNs. Therefore, creating scalable and efficient SDN solutions by adopting a single controller is challenging.

To address such a challenge, the placement of multiple controllers across the entire network can address the performance limitation of a single controller while retaining the benefit of network control centralization. In this case, several fundamental network planning problems have to be solved regarding (1) the minimum number of controllers, (2) their optimal deployment locations, (3) control domain assignments between switches and controllers, and (4) the optimal control traffic forwarding paths between switches and their corresponding controllers. When an in-band control channel is used, both control and data traffic have to share the same forwarding infrastructure, and such a problem becomes even more prominent.

A network planning method for SDN is used to determine the optimal placement for multiple controllers and balances link traffic loads according to the control and data traffic dynamics. The method is a traffic-driven optimal network planning problem that is formulated as a nonlinear multi-objective optimization. A number of controllers placed is minimized and at the same time, control traffic delay is shorter than a predefined threshold with a high probability.

To implement the method, a control traffic optimization problem is defined as a nonlinear multi objective (mixed integer and continuous) optimization in which the number of controllers is an integer-valued objective and the traffic delay belongs to a continuous one.

To solve such a complex optimization problem in a timely manner, the optimization problem is partitioned into two sub problems: multi-controller placement (MCP) and control traffic balancing (CTB). The MCP problem aims to find the minimum number of controllers and their respective deployment locations to cover all switches while the CTB problem aims at finding delay optimal forwarding paths for control traffic between the switches and the deployed controllers.

Once MCP has been performed, the CTB sub-problem is solved for the given MCP. The CTB sub-problem belongs to a non-separable nonlinear continuous optimization, its complexity is extremely high as a result of (i) its nonlinearity and (ii) massive variables of link traffic assignments for large-size networks (i.e. combinatorial explosion of flow-to-link traffic assignments).

To solve the CTB optimization problem, the fundamental structure of CTB is analyzed by proving its polynomial time complexity (i.e. it's polynomiality) for a given placement of multiple controllers. Specifically, the CTB optimization problem is a strictly convex problem. The solution can be approximated by a polynomial-time fast algorithm. Furthermore, a polynomial-time approximation algorithm (PTAA) for the CTB problem is used to yield the optimal solution with fast convergence rate $O(1/c^m)$ with constant $c>1$ and iteration number m. Such fast convergence in one embodiment may be based on an adopted alternating direction method of multipliers (ADMM), an emerging parallel and fast first-order method for solving largescale convex optimization problems.

To realize multi-controller control traffic balancing in a time-efficient way, several existing fast algorithms can be extended to solve a balancing optimization framework. For example, in one embodiment, the modified alternating direction method of multipliers (ADMM) is a fast and possible parallel solving approach that iteratively deals with primal and dual updating algorithms for sub-optimization problems.

An adaptive feedback control scheme may be used to iteratively solve the optimal controller placement (i.e., MCP) problem and the control traffic balancing (i.e., CTB) problem in such a way that the control traffic delay is shorter than the desired threshold with a predefined probability while requiring the deployment of a small number of controllers.

SDNs, which require many signaling events and control plane operations could easily generate a significant amount of control traffic that must be addressed together with data traffic. However, existing work all focuses on balancing data traffic in the data plane, such as prioritizing interactive, elastic, and background traffic in an integration of dynamic load balancing, multi-path forwarding, and congestion control with the ability of per-flow and per-packet traffic splitting for data-center networks.

In various embodiments, multi-controller placement and control traffic balancing for the design of optimal network planning provides an efficient, adaptive control scheme that guarantees an optimum solution with fast replanning of controller placement and forwarding paths over time varying QoS requirements, traffic statistics, and network topology in SDNs.

FIGS. 1A, 1B, 1C, and 1D are block diagrams of an SDN 100 that generally consists of a number of Openflow enabled switches (i.e. OF-switches) and centralized SDN controllers. FIG. 1A illustrates various links or connections for transferring data between different devices comprising SDN 100. SDN 100 is an architecture representation of a simple software defined network with eight OF-switches 110, 112, 114, 116, 118, 120, 122, 124 and two controllers 126, 128. Links between switches are shown as solid lines indicated at 130, 132, 134, 136, 138, 140, 142, and 144. Each OF-switch forwards the traffic from a variety of networks, such as IP data networks represented as server 150 and cellular networks represented by an eNB (enhanced Node B) 152 and gateway 154. Each controller 126 and 128 is shown with a link as indicated at 156, 158 to respective switches 118 and 116.

Figure 1B:
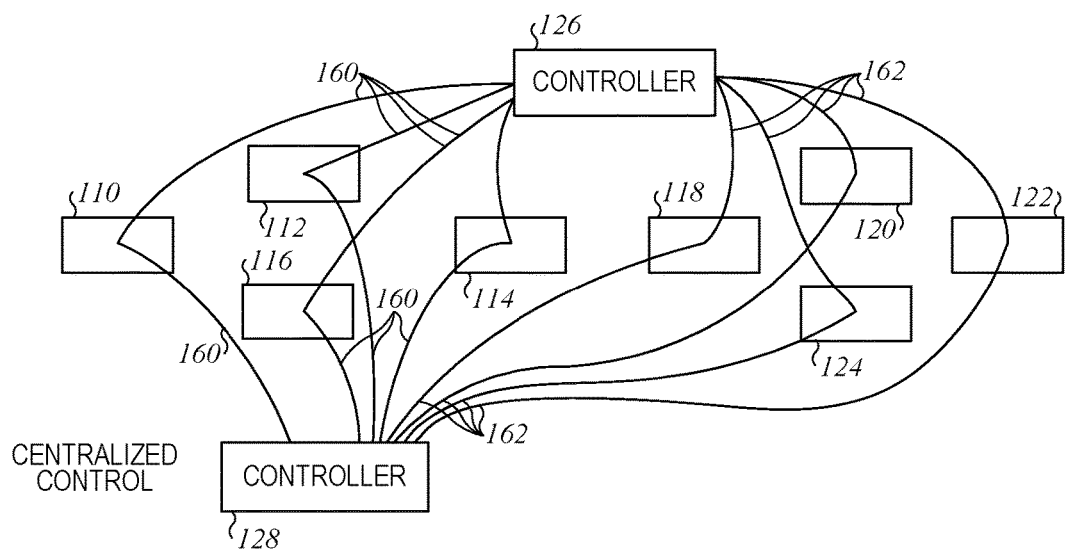
FIG. 1B illustrates centralized control of switches provided by the multiple controllers according to an example embodiment.
Figure 1C:
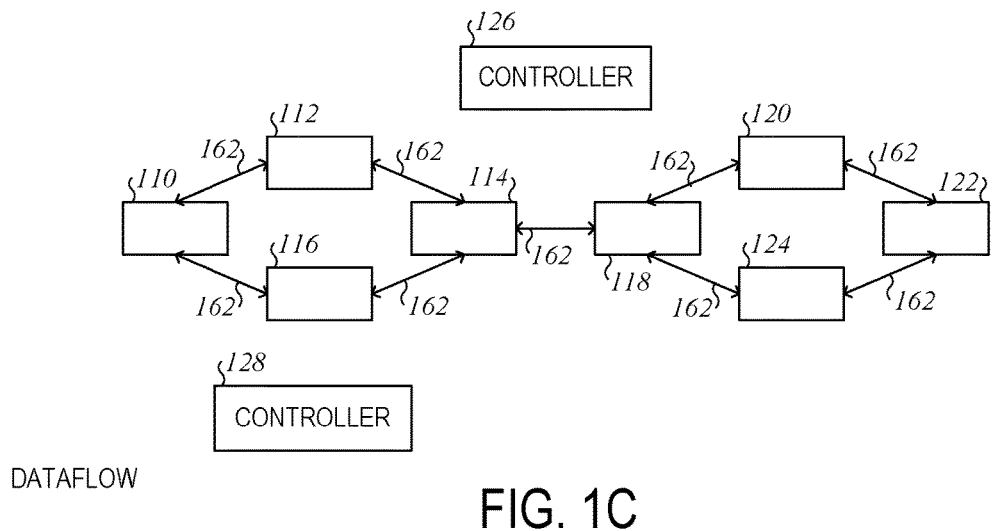
FIG. 1C illustrates data flow between switches according to an example embodiment.
Figure 1D:
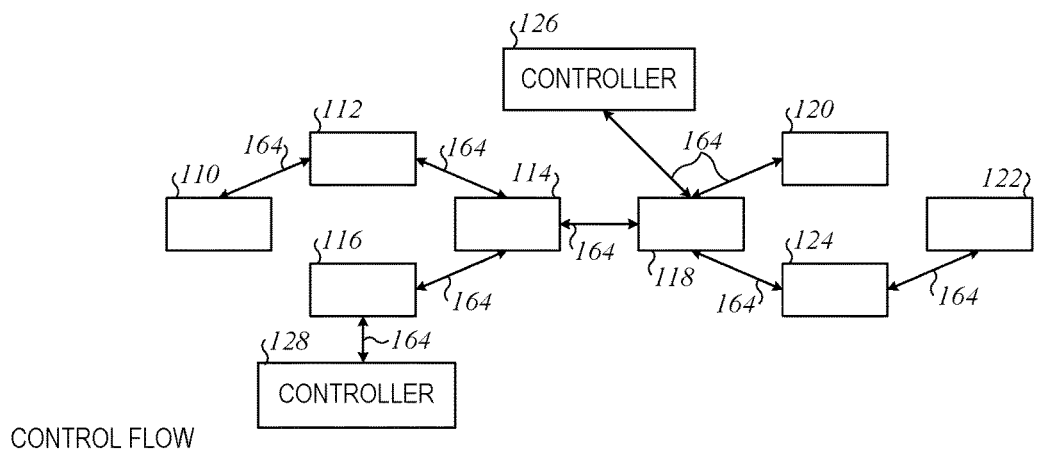
FIG. 1D illustrates control flow between switches and controllers according to an example embodiment.

FIG. 1B illustrates centralized control provided by the multiple controllers, which each controller providing control to each switch as indicated by lines 160. FIG. 1C illustrates data flow 162 between switches, and FIG. 1D illustrates control flow 164 between switches and controllers. FIGS. 1A-D illustrate one simple topology for purposes of illustration. In further embodiments, different connections may be made between the switches and controllers and different numbers of switches and controllers may be utilized.

Whenever a new data flow is generated, the responsible OF-switch sends a routing request to the assigned SDN controller. Once the controller receives the control message, the controller calculates the optimal routing path(s) to the destination OF-switch and sets up routing tables of switches along the optimal path(s). Two approaches develop control channels: dedicated out-band control, where control traffic is dedicated to a separate channel, or in-band control, wherein control traffic is affected by data traffic. Out-band control uses a dedicated network to establish direct control links between each OF-switch and their responsible controller. Such an approach is cost-prohibitive and not suitable for large-scale networks, such as metropolitan-area-networks that span a city. On the contrary, in-band control allows control and data messages to share the same forwarding infrastructure and thus is more cost-efficient. Various embodiments of the present subject matter employ in-band control.

Figure 2:
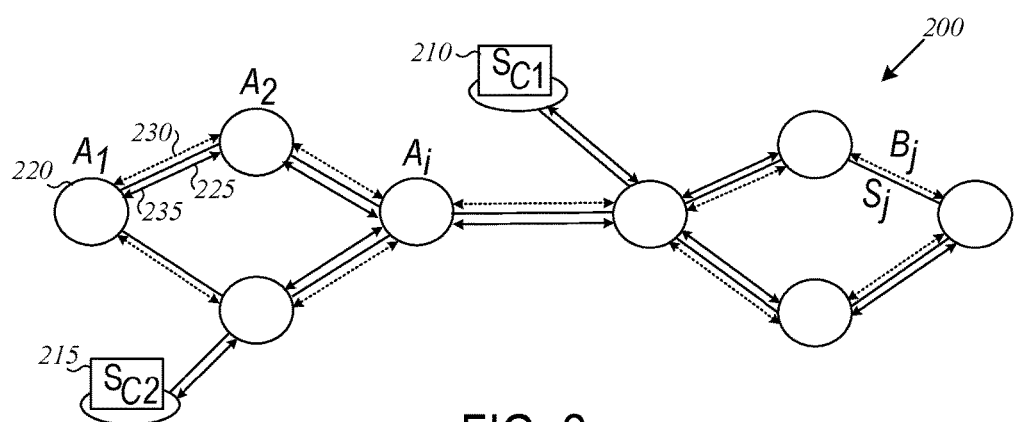
FIG. 2 is a graph illustrating flows in an SDN according to an example embodiment.

The SDN 100 is modeled by a graph (G) at 200 in FIG. 2. The controllers are indicated as $S_{C1}$ and $S_{C2}$ at 210 and 215. The switches are represented as circles 220. Links are represented as solid lines 225 between the switches. Data flow is represented as broken lines 330 with an arrow head on each end, and control flow is represented as solid lines 335 with an arrow head on each end.

In graph 200, G=(V; J), where V is the set of OF-switches with total n switches (i.e., |V|=n) and J is the set of links with total |J| links. Control flow is represented by $A_i$, data flow by $B_j$, and link capacity by $S_j$. $S_{Ck}$ represents controller serving capacity. A controller can be placed at any location among all OF-switches. The set of SDN controllers K⊆V includes a total of C controllers, and the serving time capability of the kth controller is modeled as an exponential distribution with mean time value $1/\mu_C^k$, ∀k∈K. Since the effectiveness and scalability of SDNs highly depend on the timely delivery of control messages from OF-switches to multiple controllers, optimal controller placement and control traffic balancing with regard to control and data traffic statistics are considered. Note that to simplify the readability, switches may be referred to as OF-switches.

Without loss of generality, both control and data flows may be modeled by regenerative processes. In particular, the control traffic of each switch i is modeled by a regenerative arrival process $A_i$ with mean value $\sigma_i$.

For the jth link and j∈J, the existing data flow follows a regenerative arrival process $B_j$ with mean value $\lambda_j$, and link serving time $S_j$ follows another regenerative process with mean time $1/\mu_j$.

To exploit a fast and possible parallel solving approach for CTB problem with immense variables, an alternating direction method of multipliers (ADMM) is used for the proposed optimization problem with the following two steps. The dual problem is formulated from the given primal problem. Both problems are alternately solved for the optimal solution. Note that while the proposed optimization problem has two possible delay objectives, in the following the derivations for the case of average delay $D_{ave}$ is the objective. Similar procedures can be done with maximum delay $D_{max}$.

Figure 3:
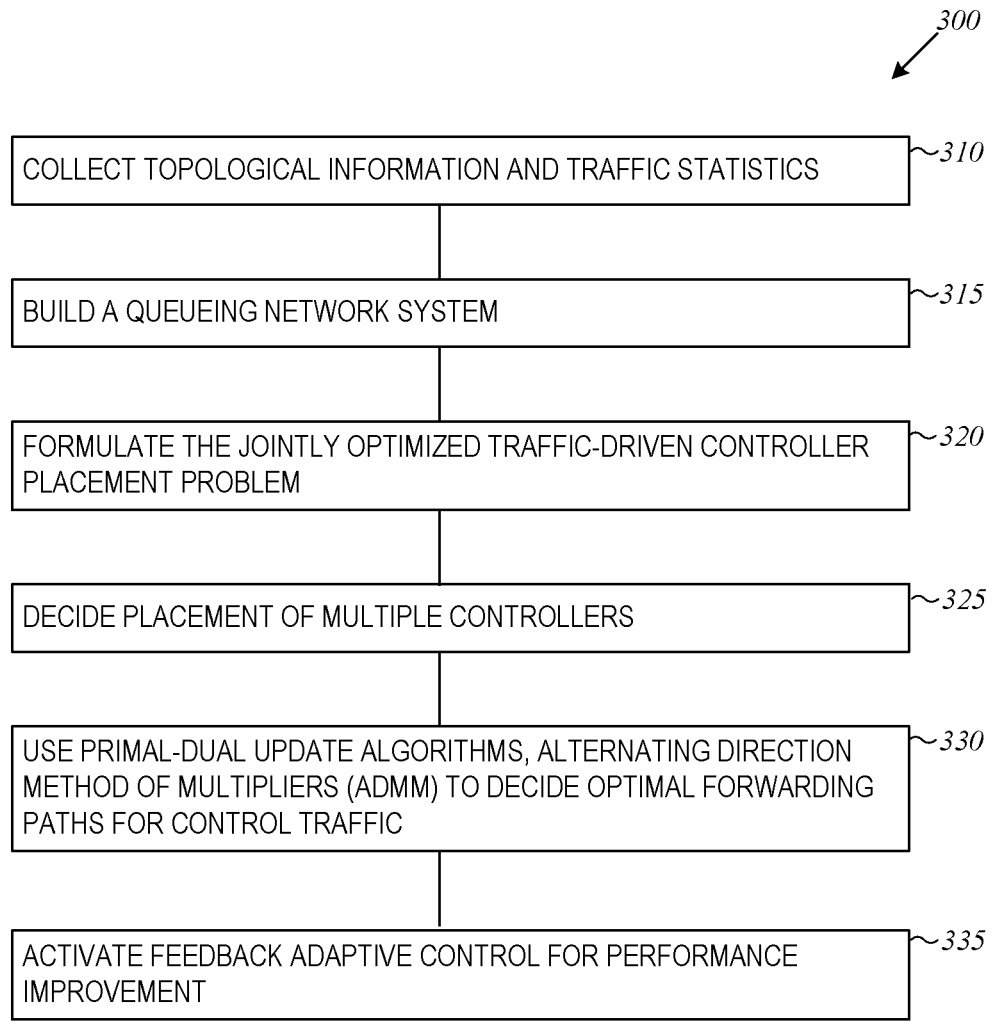
FIG. 3 is a flowchart illustrating a method of placing controllers and defining control traffic flow in an SDN according to an example embodiment.

FIG. 3 is a flowchart illustrating a method 300 of placing controllers and defining control traffic flow in an SDN. At 310, topological information and traffic statistics for an existing network are obtained. Such topological information may include switches, controllers, and links in the existing network, as well as various capacities of the network elements and may be generated as a network is initially built or later by performing a physical or electronic based inventory analysis of the network. At 315, a queueing network may be constructed such as shown at 200 in FIG. 2, and at 320, a jointly optimized traffic driven controller placement problem is formulated.

The controller placement problem may then be decided at 325 to determine the placement of multiple controllers, using an approximate approach. One such approach includes a randomized rounding approach where each switch has a selection likelihood and one or more assignment likelihoods in the representation of the SDN. The representation may allow formulation of the controller placement decisions as search/optimization operations based on an objective measure. For example, a control placement algorithm may be configured with constraints settings specifying relationships among possible assignment/selection values for each switch.

Search/optimization operations may be performed by identifying possible values of the selection likelihood and the assignment likelihoods of each switch subject to allocation constraint imposed on one or more controllers of the SDN. Constraints can include requirements or constraints, such as an allocation constraint or other applicable constraints for determining controller placements. Values of an objective measure of the switches may be compared among the possible values of the selection likelihood. Based on the comparison, a set of values from the possible values of the selection likelihood and the assignment likelihoods of each switch may be selected.

Determining whether a controller should be located with a switch and which controller a switch should be assigned to may be based on the result of search/optimization operations, by rounding the set of values selected to integer values respectively in a randomized rounding manner. Controller placement may provide good planning for the minimum required number of controllers as well as the decisions of controller locations and control domain assignments. Other approaches may be used to approximate placement locations for the multiple controllers, and in some embodiments, a controller may simply be placed at each switch.

Once the controller placement problem has been solved, primal-dual update algorithms may be used via an alternating direction method of multipliers (ADMM) to decide optimal forwarding paths for control traffic. This results in links with higher residual capacity, taking into account data traffic, being assigned for routes of control traffic from controllers to switches. The algorithms may provide fast convergence using an iterative algorithm to yield an optimal solution in a few iterations that provide a sub-optimal solution in each iteration. Use of the algorithms can significantly reduce network delay and congestion for real-time applications.

Once the optimal forwarding paths are identified, the SDN may proceed to run, with new flows assigned routes by the multiple different controllers. At 335, active feedback adaptive control may be performed for performance improvement. Such active feedback adaptive control may result in the re-solving of the above problems given changes in traffic loading and further may result in changes in the number of controllers, their placement, and control traffic assignments.

Figure 4:
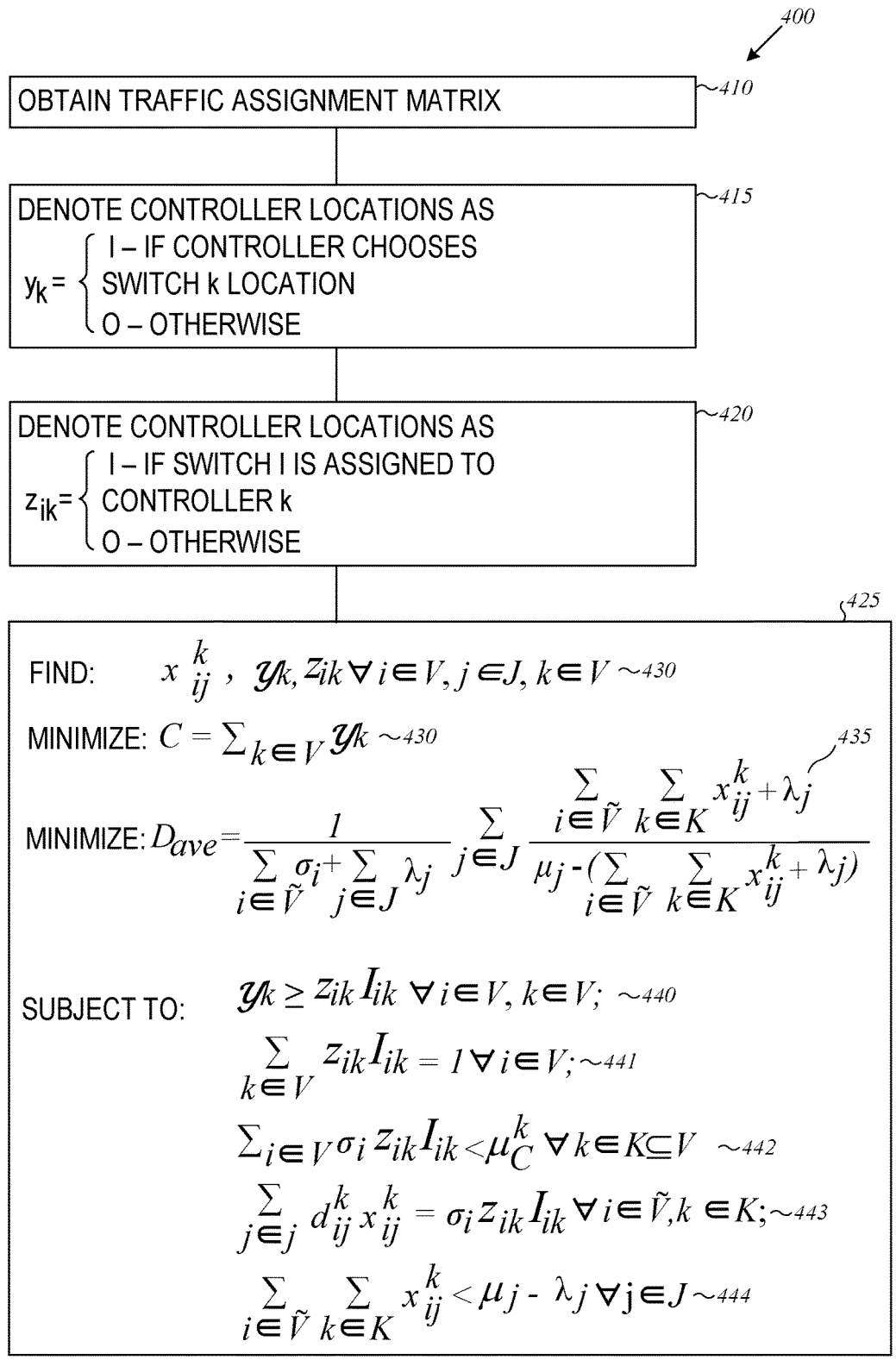
FIG. 4 is a flow diagram illustrating a method optimizing control traffic balancing with multiple controllers according to an example embodiment.

FIG. 4 is a flow diagram illustrating a method 400 optimizing control traffic balancing with multiple controllers. As indicated at 410, a traffic assignment matrix $x=[x_{ij}^k]$ $i \in V$, $j \in J$, $k \in V$, where $x_{ij}^k$ denotes the amount of control traffic on link j that originates from switch i to controller k, is obtained with respect to minimizing the network delay.

Each switch i's location can be a controller k's location (i.e., $k \in V$). The following variables are defined to address the placement problem. $\{y_k; \forall k \in V\}$ denotes the controller locations at 415 as $$y_k \begin{cases} 1, & \text{if a } controllerchoosesswitch\ k's\ \text{location}; \\ 0, & \text{otherwise} \end{cases},$$

The number of total controllers C becomes $\Sigma_{k \in V}\ y_k$. $\{Z_{ik}, \forall_i \in V; k \in V\}$ denotes the control domain assignments between switches and controllers at 420 as $$z_{ik} \begin{cases} 1, & \text{if switch } i \text{ is assigned to controller } k; \\ 0, & \text{otherwise} \end{cases}.$$

The problem is then set forth at 425, and involves finding $x_{ij}^k$, $y_k$, $z_{ik}$ for all $i \in V$, $j \in J$, $k \in V$ as indicated at 430, while minimizing $C = \Sigma_{k \in V} y_k$, and $$D_{ave} = \frac{1}{\sum_{i \in V} \sigma_i + \sum_{j \in J} \lambda_j} \sum_{j \in J} \frac{\sum_{i \in V} \sum_{k \in K} x_{ij}^k + \lambda_j}{\mu_j - \left(\sum_{i \in V} \sum_{k \in K} x_{ij}^k + \lambda_j\right)}$$

as indicated at 435. $D_{ave}$ denotes the average network delay among all links. The problem solution is subject to multiple constraints as indicated at 440, 441, 442, 443, and 444:

$$y_k \geq z_{ik} I_{ik} \forall\ i \in V, k \in V;$$

$$\sum_{k \in V} z_{ik} I_{ik} = 1 \forall\ i \in V;$$

$$\sum_{i \in V} \sigma_i z_{ik} I_{ik} < \mu_C^k \forall\ k \in K \subseteq V;$$

$$\sum_{j \in J} d_{ij}^k x_{ij}^k = \sigma_i z_{ik} I_{ik} \forall\ i \in \tilde{V}, k \in K;$$

$$\sum_{i \in \tilde{V}} \sum_{k \in K} x_{ij}^k < \mu_j - \lambda_j \forall\ j \in J$$

The constraints are related to the controller locations, $y_k$ at 440, which implies that a controller is set at a switch's location if that location has at least one switch assigned to from control domain assignments, the dedicated controller assignment at 441, which implies that each switch will be assigned to a single dedicated controller, controller serving capability at 442, which implies that the serving capability of each controller should be enough for the arrival control messages of the assigned switches, control flow conservation at 443, which implies that the control flow initiated by each switch should equal to the total amount of split flow portions on the selected transmission links, link capacity constraint 444, which implies that the incoming traffic rates (including control and data flows) should be less than the link service rates.

Figure 5:
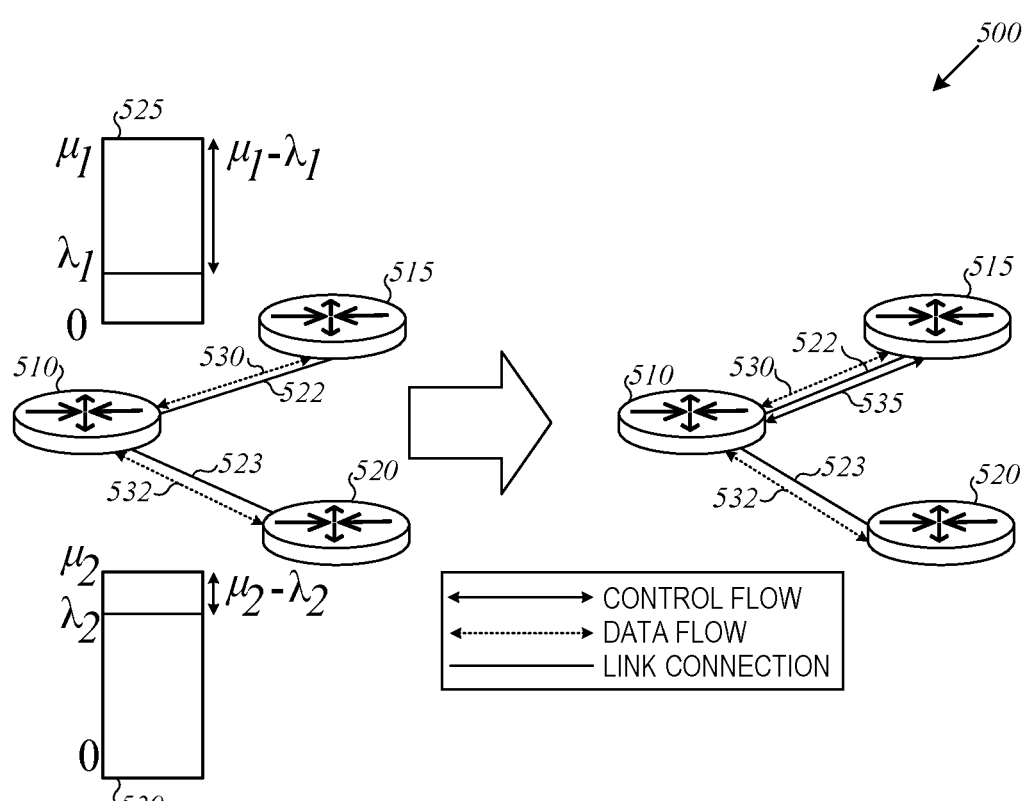
FIG. 5 is a graphic representation of balancing control traffic in an SDN according to an example embodiment.

Control traffic may be balanced as illustrated generally at 500 in FIG. 5, which is a graphic representation of selection of a link for a given control traffic flow. A simplified SDN of three switches 510, 515, and 520 with links 522 and 523 is shown. Residual capacity for link 522 is shown in graph form at 525, which illustrates the capacity $u_1$-$\lambda_1$ taking into account all data traffic on the link. Residual capacity for link 523 is represented at 530 as $u_2$-$\lambda_2$. As shown, the residual capacity for link 522 is larger than the residual capacity for link 523. Thus, as indicated at 525, link 522 is probabilistically selected for routing control flow between switches 510 and 515. Data flow is indicated by lines 530 and 532.

Figure 6:
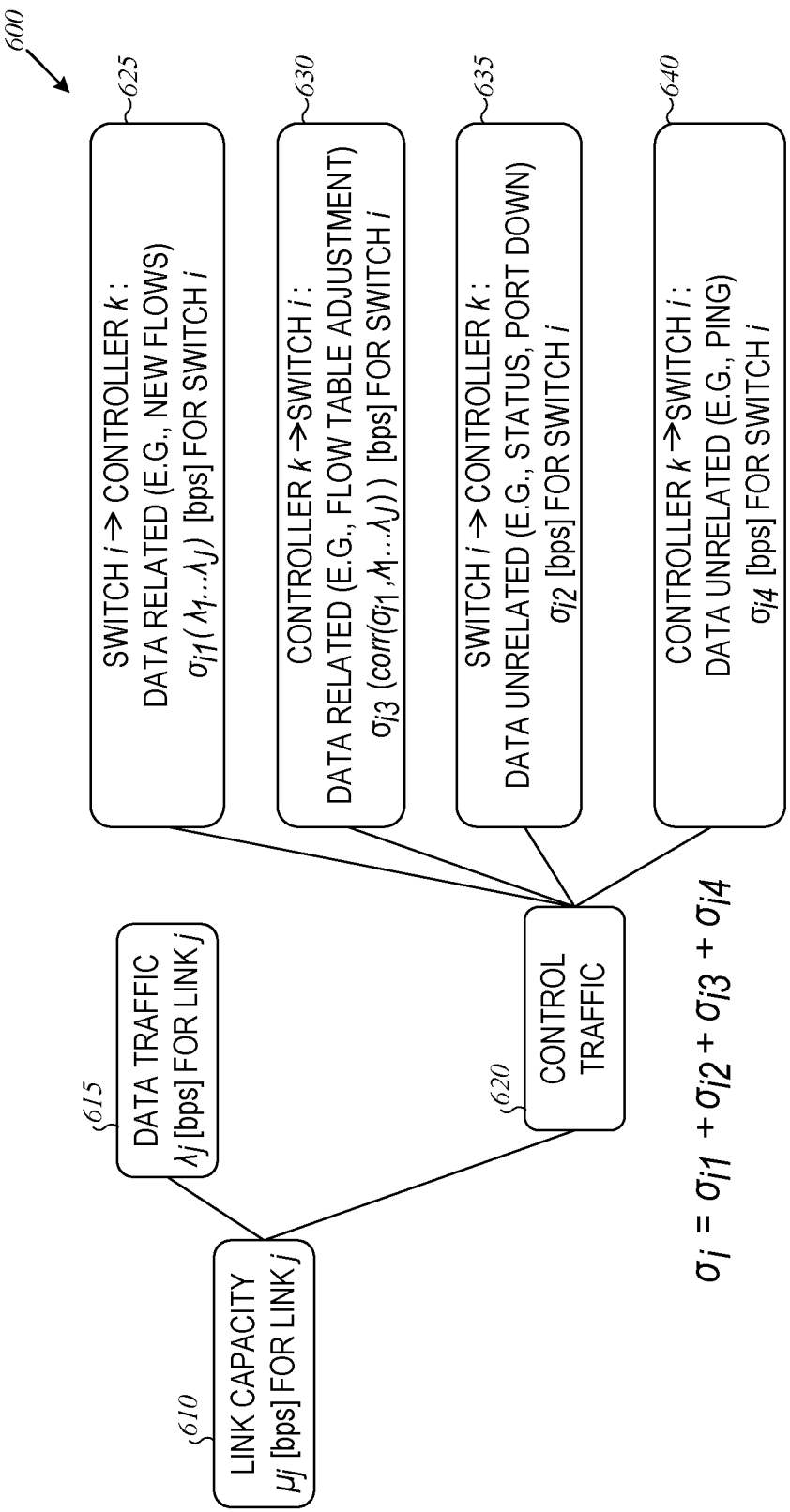
FIG. 6 is a representation of in-band traffic for a link according to an example embodiment.

FIG. 6 at 600 is a representation of in-band traffic for a link. Overall capacity $u_j$ of the link j is represented in bits per second (bps) at 610. Data traffic, $\lambda_j$ for the link is shown at 615. Control traffic 620 is comprised of many different types and directions as indicated at 625, 630, 635, and 640. Control traffic 625 is represented as moving from switch i to controller k and is data related, such as for example new flow packets. Controller k to switch i control traffic 630 is also data related, such flow table adjustments. Switch i to controller k control traffic at 635 may be unrelated to data, and may include notifications like a status, such as a port down. Controller k to switch i traffic indicated at 640 may also be unrelated to data, and may include for example, a ping. Each of the control traffic flows has a corresponding bps indication and is summed at 620 to provide the bps for control traffic between switch i and controller k: $\sigma_i = \sigma_{i1} + \sigma_{i2} + \sigma_{i3} + \sigma_{i4}$.

Figure 7:
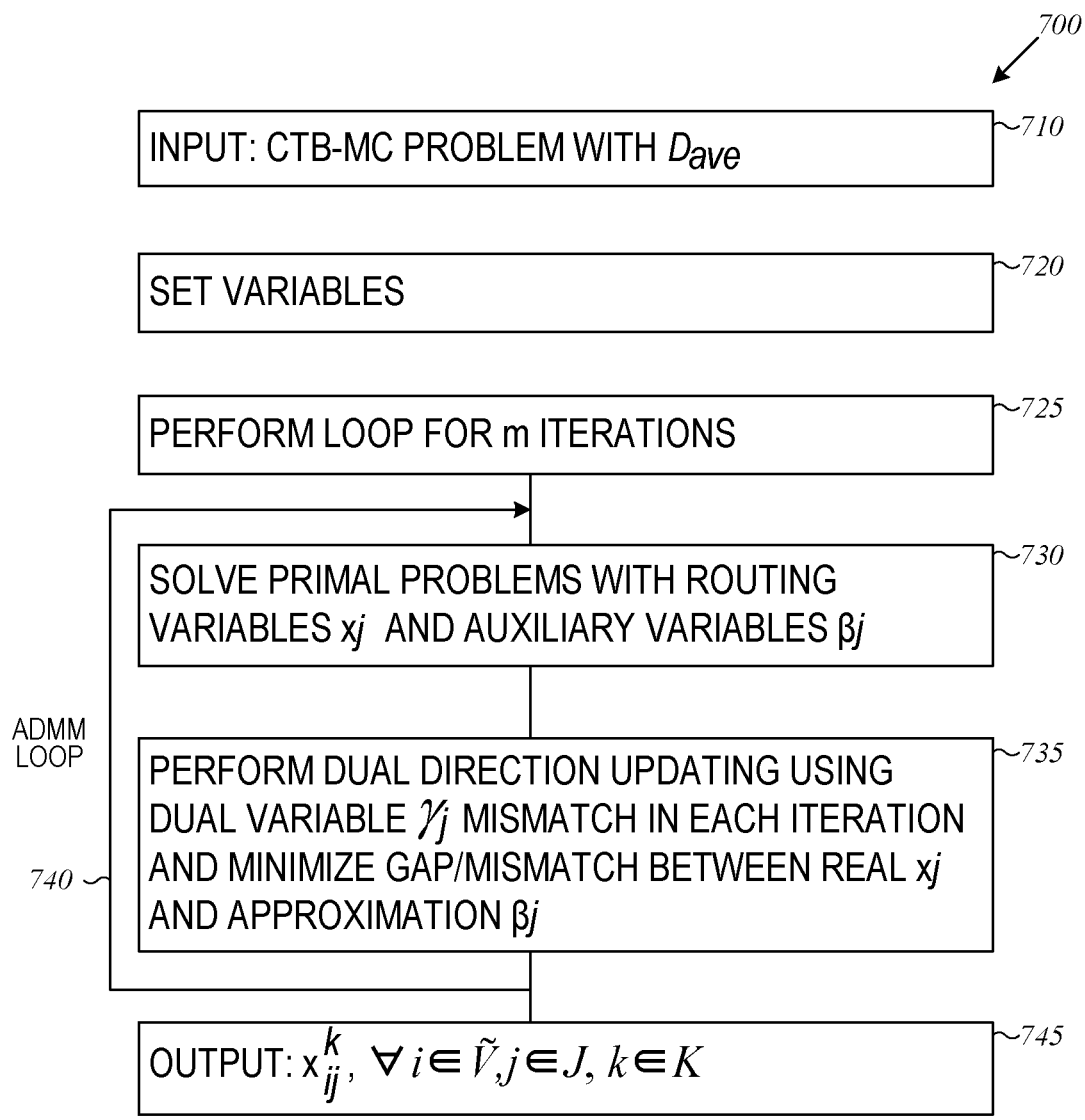
FIG. 7 is a flowchart illustrating a method of solving a control traffic balancing-multi-controller (CTB-MC) problem according to an example embodiment.

FIG. 7 is a flowchart illustrating method 700 of solving the CTB-MC problem. The method is also illustrated as "Algorithm 2" in Table 1 below. At 710, the CTB-MC problem is an input with $D_{ave}$. Variables are set at 720, corresponding to line 1 in Table 1. At 725, a loop is performed for "m" iterations, as also indicated in line 2 of Table 1. The loop includes solving primal problems with routing variables $x_j$ corresponding to line 3 in Table 1, and auxiliary or approximated variable $\beta_j$ corresponding to line 4 in Table 1 as indicated at 730. For $x_j$, a quadratic objective with linear constraints is solved. Specifically, the objective is to minimize a gap/mismatch between real $x_j$ and the approximation $\beta_j$ in the mth iteration while guaranteeing the link capacity at 444. For $\beta_j$, linear constraint is used. Specifically, the objective is to minimize control traffic delay $D_{ave}$ plus the gap between the real $x_j$ in the (m+1)th iteration while guaranteeing the control flow conservation at 443. Topology mapping coefficients $g_j^1$, $g_j^2$ and multi-path routes by way of the switch and the controller to each link are used. For example, the topology mapping coefficients that account for the link rate contribution to the end-to-end (switch-controller) control flow can be modeled as:

$$(g_j^1 \ g_j^2) = ([1 \ \ldots \ 1] \ [1 \ \ldots \ 1] \ \ldots \ [1 \ \ldots \ 1])$$

$$\begin{pmatrix} [d_{1j}^1 \ \ldots \ d_{1j}^{\tilde{c}}] & [d_{2j}^1 \ \ldots \ d_{2j}^{\tilde{c}}] & \ldots & [d_{\tilde{n}j}^1 \ \ldots \ d_{\tilde{n}j}^{\tilde{c}}] \\ [1 \ \ldots \ 1] & [1 \ \ldots \ 1] & \ldots & [1 \ \ldots \ 1] \end{pmatrix}^\dagger$$

Following the primal problems being solved, a dual variable $y_j$ is computed in each iteration and the gap/mismatch between real $x_j$ and approximation $\beta_j$ is computed as indicated at line 5 in Table 1. The traffic assignment matrix may be reset following each iteration. The ADMM loop is indicated at 740 and comprises the steps involved in each iteration. The number of iterations m may vary in different embodiments depending on system resources available for the iterations and desired convergence. Simulation results indicate that in one embodiment, about 150 iterations may serve as a sufficient stopping point. The number of iterations may vary in different embodiments. Method 700 provides an output 745 in the form of a traffic assignment matrix that may be used to configure controllers and control traffic on the SDN.

TABLE 1

Input: CTB-MC problem with $D_{ave}$.
Output: $x_{ij}^k$, $\forall \ i \in \tilde{V}, j \in J, k \in K$
1 Set $\tilde{x}_j^{(0)} = 0, \tilde{\beta}_j^{(0)} = 0, \tilde{\gamma}_j^{(0)} = 0, \forall \ j \in J$
2 for m = 0, 1, . . . do
3 | Compute $\tilde{x}_j^{(m+1)}, \forall \ j \in J$ according to
  | Find: $\tilde{x}_j \ \forall \ j \in J$ Minimize $\dfrac{\tilde{n}\tilde{C}\beta}{2} \sum_{j \in J} (\tilde{x}_j - \tilde{\beta}_j^{(m)} + \tilde{\gamma}_j^{(m)})^2$, Subject to $\tilde{n}\tilde{C}\tilde{x}_j < \mu_j - \lambda_j \ \forall \ j \in J$
4 | Compute $\tilde{\beta}_j^{(m+1)}, \forall \ j \in J$ according to
  | Find: $\beta_j \ \forall \ j \in J$ Minimize $\dfrac{1}{\sum_{i \in V} \sigma_i + \sum_{j \in J} \gamma_j} \sum_{j \in J} \dfrac{\tilde{n}\tilde{C}\beta_j + \gamma_j}{\mu_j - (\tilde{n}\tilde{C}\beta_j + \gamma_j)} + \dfrac{\tilde{n}\tilde{C}\beta}{2} \sum_{j \in J} (\beta_j - \tilde{x}_j^{(m+1)} - \tilde{\gamma}_j^{(m)})^2$.

Subject to $\sum_{j \in J} \dfrac{1 - g_j^2}{\mu_j^1} \tilde{\beta}_j = \dfrac{\sum_{i \in \tilde{V}} \sum_{k \in K} \sigma_i \tilde{z}_{ik} I_{ik}}{\tilde{n}C}$ 5 | Compute $\tilde{\gamma}_j^{(m+1)}, \forall \ j \in J$ according to
  | $\gamma_j^{(m+1)} = \gamma_j^{(m)} + \tilde{x}_j^{(m+1)} - \beta_j^{(m+1)} \ \forall \ j \in J.$
6 | Set $x_{ij}^{b(m+1)}$ from $\tilde{x}_j^{(m+1)}, \forall \ i \in \tilde{V}, j \in J, k \in K$
7 end As network size and traffic flow dramatically changes, the controller placement, switch-controller association, and control traffic forwarding paths may need to be replanned. In this section, it is assumed that the network operator has already deployed servers at particular locations throughout the network. The controllers are running on these servers, which can be in either active mode or inactive mode. A controller is active if at least one OF-switch is assigned to it and the controller is inactive otherwise. An adaptive feedback control scheme adaptively activates the controllers at the optimal locations and selects the optimal forwarding paths for control traffic according to time-varying traffic volume.

Because of the randomness features of control and data flows, it is more practical to provide statistical guarantees (i.e. the probability that the packet violates its delay constraint is bounded) in QoS control over SDNs. That is, $Pr[W(t) \geq W^B] \leq \tau$, where $W(t)$ is the queueing delay, $W^B$ is the requisite bound, and $\tau$ characterizes the degree of guarantees. The violation probability can be upper-bounded as $Pr\{W(t) \geq W^B\} \leq f(W(t), W^B)$. A function $f$ is formulated with respect to the average delay $D_{ave}$ and maximum delay $D_{max}$ and obtain the network throughput of control messages within the statistical delay guarantees. More specifically, this system throughput characterizes the allowable control traffic from switches, which satisfies the delay constraint:

$$Pr[W(t) \geq W^B] \leq f(W(t), W^B) \leq \tau.$$

First, regarding the average transmission delay $D_{ave}$, we formulate the upper-bounded function $f$ by Markov inequality. In particular, $$Pr[W(t) \geq W^B] \leq \frac{E(W(t))}{W^B} = \frac{D_{ave}}{W^B} \leq \tau_{ave}^*.$$

where $\tau_{ave}^*$ is the predefined probability threshold. Moreover, the achievable throughput under QoS guarantee ($W^B$, $\tau_{ave}^*$) is yielded as $\Sigma_{i \in V} \sigma_i$.

With regards of the maximum average delay $D_{max}$, let $W_j(t)$ denote the transmission delay of link $j \in J$ and $W_{max}(t)$ denote the maximum link delay (i.e., $W_{max}(t) = \max_{j \in J} W_j(t)$). Then, this maximum delay can be upper-bounded as $$Pr[W_{max}(t) \geq W_{max}^B] = 1 - Pr[W_1(t) \leq W_{max}^B] \times \ldots \times Pr[W_{|J|}(t) \leq W_{max}^B] \leq$$
$$1 - \left[1 - \frac{E(W_1(t))}{W_{max}^B}\right] \ldots \left[1 - \frac{E(W_{|J|}(t))}{W_{max}^B}\right] \leq$$
$$1 - \left(1 - \frac{D_{max}}{W_{max}^B}\right)^{|J|} \leq 1 - \frac{|J|D_{max}}{W_{max}^B} \leq \tau_{max}^*.$$

where $\tau_{max}^*$ is the predefined probability threshold. The first equality comes from the assumption of independence among $W_j$; $\forall j \in J$; the second inequality follows Markov inequality. Now, the achievable throughput $\Sigma_{i \in V} \sigma_i$ satisfies the QoS guarantee ($W_{max}^B$, $\tau_{max}^*$).

Figure 8:
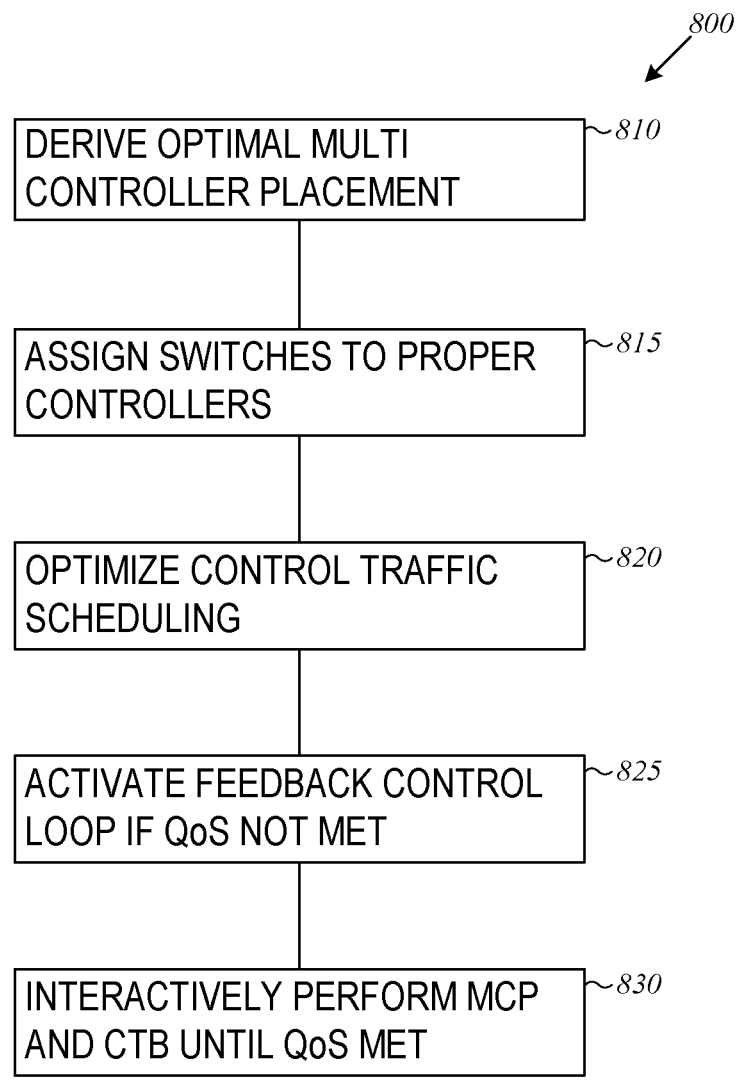
FIG. 8 is a flowchart illustrating a method of feedback control for replanning controller and control traffic to meet quality of service (QoS) according to an example embodiment.

As indicated in flowchart form at 800 in FIG. 8. The optimal multi-controller placement (i.e., activate the controllers at proper servers) is first derived at 810, then switches are assigned to proper controllers at 815. Next the traffic scheduling (i.e., control traffic balancing) is optimized upon this switch-controller assignment at 820, and finally the feedback control loop is activated at 825 if the scheduling result doesn't meet the QoS requirements. More specifically, the required QoS guarantee from upper applications gives three specific parameters: the delay metric (i.e., the average packet latency or the maximum link transmission latency), the corresponding requisite delay bound $W^B$ and the degree of guarantee $\tau$. Setting these parameters and the network planning framework as the input, an Algorithm in Table 2 below iteratively exploits the MCP solution and the CTB solution at 830 until the QoS guarantee is fulfilled. In particular, NSQG function in line 2 of Table 2 enables the feedback control that gives the true value if the statistical QoS guarantee is not satisfied in the current round. In that case, the algorithm enables the successive round and stops whenever it reaches the optimal solutions. Therefore, the fast-convergent features of proposed algorithms for both MCP problem (i.e., at most two rounds in average) and CTB problem (i.e., $O(1/c^m)$) allow reconfiguring of the entire system efficiently according to time-varying traffic statistics and network topology.

TABLE 2

| | Input : QoS Guarantee ($W^B$, $\tau$) and Traffic-Driven Network Planning in Eq. (10) |
|---|---|
| | Output: $\Sigma_{i \in V} \sigma^*_i$ ; $(y^*_k, z^*_{ik}), x_{ij}^{k*}, \forall i \in V, j \in J, k \in K$ |
| 1 | Set $\sigma_i = \infty$, $\forall\, i \in V$; $D = \infty$ % Initialization |
| 2 | while NSQG(D, $W^B$, $\tau$) do |
| 3 | $\|\{\sigma_i\}\|_1 \leftarrow \|\{\sigma_i\}\|_1 - 1$ |
| 4 | $(\bar{C}; \bar{y}_k, \bar{z}_{ik}) \leftarrow$ Algorithm 1($\{\sigma_i\}$, Eq. (10)) % MCP |
| 5 | (D, $x_{ij}^k$) $\leftarrow$ Algorithm 2($\bar{y}_k, \bar{z}_{ik}$, Eq. (11)) % CTB |
| 6 | end |
| 7 | $\Sigma_{i \in V} \sigma^*_i = \|\{\sigma_i\}\|_1$; $\{y^*_k, z^*_{ik}, x_{ij}^{k*}\} \leftarrow \{\bar{y}_k, \bar{z}_{ik}, x_{ij}^k\}$ |

Figure 9:
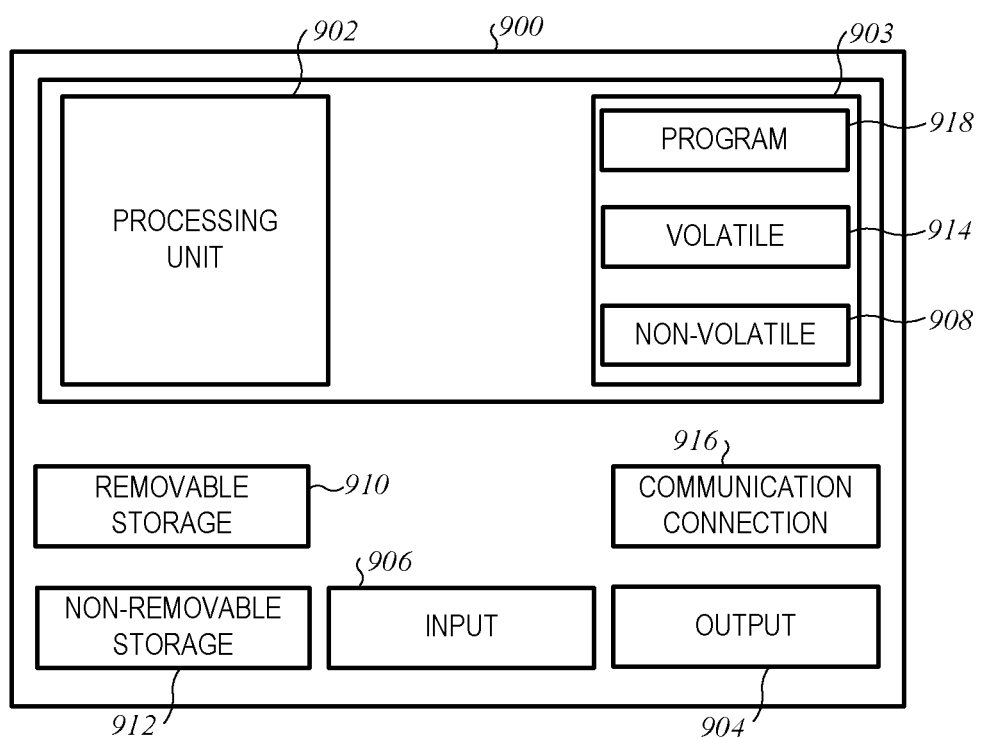
FIG. 9 is a block diagram illustrating circuitry for clients, servers, cloud based resources for implementing algorithms and performing methods according to example embodiments.

FIG. 9 is a block diagram illustrating circuitry for clients, servers, cloud based resources for implementing algorithms and performing methods according to example embodiments. All components need not be used in various embodiments. For example, the clients, servers, and network resources may each use a different set of components, or in the case of servers for example, larger storage devices.

One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, or other computing device including the same or similar elements as illustrated and described with regard to FIG. 9. Devices, such as smartphones, tablets, and smartwatches, are generally collectively referred to as mobile devices or user equipment. Further, although the various data storage elements are illustrated as part of the computer 900, the storage may also or alternatively include cloud-based storage accessible via a network, such as the Internet or server based storage.

Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input 906, output 904, and a communication connection 916. Output 904 may include a display device, such as a touchscreen, that also may serve as an input device. The input 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 902 of the computer 900. A hard drive, CD-ROM, and RAM are some examples of articles including a non-transitory computer-readable medium such as a storage device. The terms computer-readable medium and storage device do not include carrier waves to the extent carrier waves are deemed too transitory. For example, a computer program 918 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 900 to provide generic access controls in a COM based computer network system having multiple users and servers. Storage can also include networked storage such as a storage area network (SAN) indicated at 920.

EXAMPLES

1. In example 1, a method includes determining a number and placement of multiple controllers in a software defined network (SDN) such that each controller controls a different set of software controlled switches in the SDN, and finding optimal forwarding paths for control traffic between the switches and controllers to minimize delay of control traffic over the software defined network.

2. The method of example 1 wherein the optimal forwarding paths comprise a traffic assignment matrix denoting the amount of control traffic on links that originate from each switch to each controller, and wherein finding the optimal forwarding paths comprises using an iteration between a primal-dual update algorithm using a modified alternating direction method of multipliers (ADMM).

3. The method of example 2 wherein the traffic on the links is obtained to minimize the network delay.

4. The method of example 3 wherein minimizing the network delay comprises minimizing an average network delay among all links.

5. The method of any of examples 3-4 wherein minimizing the network delay is subject to constraints comprising controller locations, control flow conservation, link capacity constraints, and traffic bandwidth guarantees.

6. The method of any of examples 1-5 wherein links are selected for control traffic as a function of residual capacity of available links.

7. The method of example 6 wherein links having a highest residual capacity as a function of data flows on the links are selected for control traffic.

8. The method of any of examples 1-7 wherein the control traffic comprises a first packet of a new data flow.

9. The method of any of examples 1-8 wherein the control traffic comprises switch flow table adjustments for routing data traffic.

10. The method of any of examples 1-9 wherein the iteration comprises a quadratic objective with linear constraints for routing variables and a linear constraint for approximated routing variables for a predetermined number of iterations.

11. The method of any of examples 1-10 and further including operating the optimized SDN, measuring quality of service (QoS), and dynamically repeating the controller placement and finding of optimal paths until a selected QoS is met.

12. In example 12, a computer implemented system includes processing circuitry, a non-transitory storage device coupled to the processing circuitry, and code stored on the storage device for execution by the processing circuitry to perform operations. The operations include determining a number and placement of multiple controllers in a software defined network (SDN) such that each controller controls a different set of software controlled switches in the SDN, and finding optimal forwarding paths for control traffic between the switches and controllers to minimize delay of control traffic over the software defined network.

13. The computer implemented system of example 12 wherein the optimal forwarding paths comprise a traffic assignment matrix denoting the amount of control traffic on links that originate from each switch to each controller and wherein the traffic on the links is obtained to minimize the network delay and wherein finding the optimal forwarding paths comprises using an iteration between a primal-dual update algorithm using a modified alternating direction method of multipliers (ADMM).

14. The computer implemented system of example 13 wherein minimizing the network delay comprises minimizing an average network delay among all links, and wherein minimizing the network delay is subject to constraints comprising controller locations, control flow conservation, link capacity constraints, and traffic bandwidth guarantees.

15. The computer implemented system of any of examples 13-14 wherein links are selected for control traffic as a function of residual capacity of available links and wherein links having a highest residual capacity as a function of data flows on the links are selected for control traffic.

16. The computer implemented system of any of examples 12-15 wherein the control traffic comprises a first packet of a new data flow and switch flow table adjustments for routing data traffic.

17. The computer implemented system of any of examples 12-16 wherein the iteration comprises a quadratic objective with linear constraints for routing variables and a linear constraint for approximated routing variables for a predetermined number of iterations.

18. The computer implemented system of any of examples 12-17 wherein the operations further include operating the optimized SDN, measuring quality of service (QoS), and dynamically repeating the controller placement and finding of optimal paths until a selected QoS is met.

19. In example 19, a non-transitory computer readable storage device has instructions for causing a processor to perform operations. The operations include determining a number and placement of multiple controllers in a software defined network (SDN) such that each controller controls a different set of software controlled switches in the SDN and finding optimal forwarding paths for control traffic between the switches and controllers to minimize delay of control traffic over the software defined network.

20. The non-transitory computer readable storage device of example 19 wherein the operations further include operating the optimized SDN, measuring quality of service (QoS), and dynamically repeating the controller placement and finding of optimal paths until a selected QoS is met; and wherein finding the optimal forwarding paths comprises using an iteration between a primal-dual update algorithm using a modified alternating direction method of multipliers (ADMM).

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
determining a number and placement of multiple controllers in a software defined network (SDN) such that each controller controls a different set of software controlled switches in the SDN, wherein the determining of the number and the placement of the multiple controllers in the SDN comprises finding convergence of an iterative optimization problem in which each iteration comprises a quadratic objective with linear constraints for routing variables and a linear constraint for approximated routing variables for a predetermined number of iterations;
finding optimal forwarding paths for control traffic between the switches and controllers to minimize delay of control traffic over the SDN; and
operating the SDN using the optimal forwarding paths for the control traffic.

2. The method of claim 1 wherein the optimal forwarding paths comprise a traffic assignment matrix denoting an amount of control traffic on links that originate from each switch to each controller, and wherein the finding of the optimal forwarding paths comprises using an iteration between a primal-dual update algorithm using a modified alternating direction method of multipliers (ADMM).

3. The method of claim 2 wherein the finding of the optimal forwarding paths comprises obtaining traffic on the links.

4. The method of claim 3 wherein the finding of the optimal forwarding paths to minimize delay of control traffic comprises finding the optimal forwarding paths to minimize an average network delay among all links.

5. The method of claim 3 wherein the finding of the optimal forwarding paths to minimize delay of control traffic is subject to constraints comprising controller locations, control flow conservation, link capacity constraints, and traffic bandwidth guarantees.

6. The method of claim 1 wherein links are selected for control traffic as a function of residual capacity of available links.

7. The method of claim 6 wherein links having a highest residual capacity as a function of data flows on the links are selected for control traffic.

8. The method of claim 1 wherein the control traffic comprises a first packet of a new data flow.

9. The method of claim 1 wherein the control traffic comprises switch flow table adjustments for routing data traffic.

10. The method of claim 1 and further comprising:
measuring quality of service (QoS); and
dynamically repeating the controller placement and finding of optimal paths until a selected QoS is met.

11. A computer implemented system comprising:
processing circuitry;
a non-transitory storage device coupled to the processing circuitry; and
code stored on the storage device for execution by the processing circuitry to perform operations comprising:
determining a number and placement of multiple controllers in a software defined network (SDN) such that each controller controls a different set of software controlled switches in the SDN, wherein the determining of the number and the placement of the multiple controllers in the SDN comprises finding convergence of an iterative optimization problem in which each iteration comprises a quadratic objective with linear constraints for routing variables and a linear constraint for approximated routing variables for a predetermined number of iterations;
finding optimal forwarding paths for control traffic between the switches and controllers to minimize delay of control traffic over the software defined network; and
operating the SDN using the optimal forwarding paths for the control traffic.

12. The computer implemented system of claim 11 wherein:
the optimal forwarding paths comprise a traffic assignment matrix denoting an amount of control traffic on links that originate from each switch to each controller; and
the finding of the optimal forwarding paths to minimize delay of control traffic comprises:
obtaining traffic on the links; and
using an iteration between a primal-dual update algorithm using a modified alternating direction method of multipliers (ADMM).

13. The computer implemented system of claim 12 wherein the finding of the optimal forwarding paths to minimize delay of control traffic comprises finding the optimal forwarding paths to minimize an average network delay among all links, subject to constraints comprising controller locations, control flow conservation, link capacity constraints, and traffic bandwidth guarantees.

14. The computer implemented system of claim 12 wherein links are selected for control traffic as a function of residual capacity of available links and wherein links having a highest residual capacity as a function of data flows on the links are selected for control traffic.

15. The computer implemented system of claim 11 wherein the control traffic comprises a first packet of a new data flow and switch flow table adjustments for routing data traffic.

16. The computer implemented system of claim 11 wherein the operations further comprise:
measuring quality of service (QoS); and
dynamically repeating the controller placement and finding of optimal paths until a selected QoS is met.

17. A non-transitory computer readable storage device having instructions for causing a processor to perform operations comprising:
determining a number and placement of multiple controllers in a software defined network (SDN) such that each controller controls a different set of software controlled switches in the SDN, wherein the determining of the number and the placement of the multiple controllers in the SDN comprises finding convergence of an iterative optimization problem in which each iteration comprises a quadratic objective with linear constraints for routing variables and a linear constraint for approximated routing variables for a predetermined number of iterations;
finding optimal forwarding paths for control traffic between the switches and controllers to minimize delay of control traffic over the software defined network; and
operating the SDN using the optimal forwarding paths for the control traffic.

18. The non-transitory computer readable storage device of claim 17 wherein the operations further comprise:
measuring quality of service (QoS);
dynamically repeating the controller placement and finding of optimal paths until a selected QoS is met; and
wherein finding the optimal forwarding paths comprises using an iteration between a primal-dual update algorithm using a modified alternating direction method of multipliers (ADMM).

19. The non-transitory computer readable storage device of claim 17 wherein the optimal forwarding paths comprise a traffic assignment matrix denoting an amount of control traffic on links that originate from each switch to each controller, and wherein the finding of the optimal forwarding paths comprises using an iteration between a primal-dual update algorithm using a modified alternating direction method of multipliers (ADMM).

20. The non-transitory computer readable storage device of claim 19 wherein the finding of the optimal forwarding paths comprises obtaining traffic on the links.

* * * * *